Jan. 11, 1927.  E. L. WIEGAND  1,614,331
ELECTRICAL HEATING ELEMENT
Original Filed August 31 1925   2 Sheets-Sheet 1
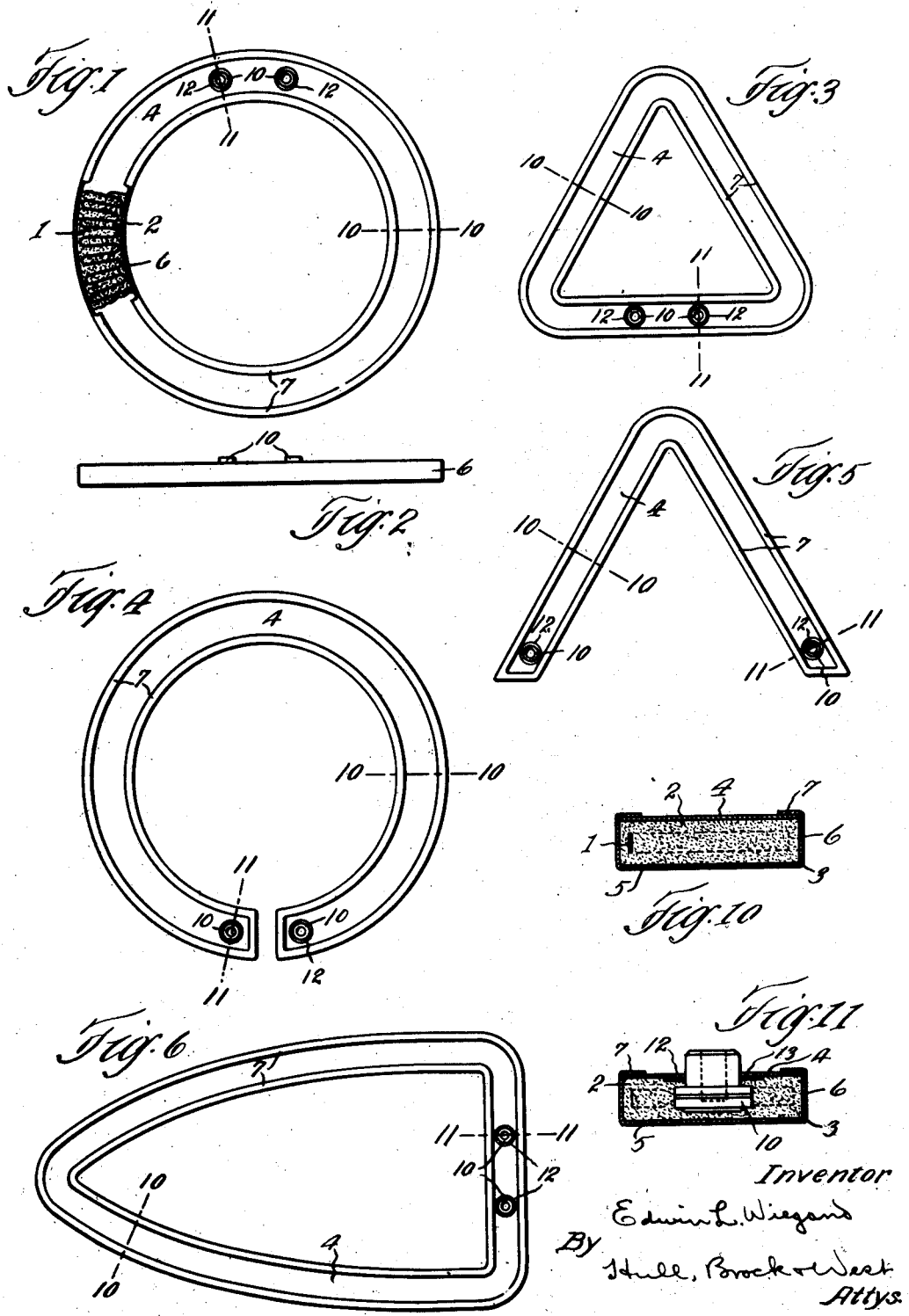

Jan. 11, 1927.  
E. L. WIEGAND  
1,614,331  
ELECTRICAL HEATING ELEMENT  
Original Filed August 31, 1923   2 Sheets-Sheet 2
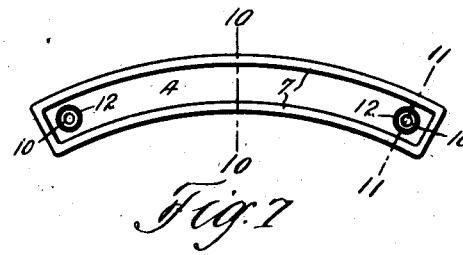
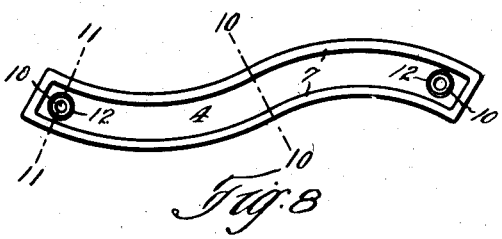
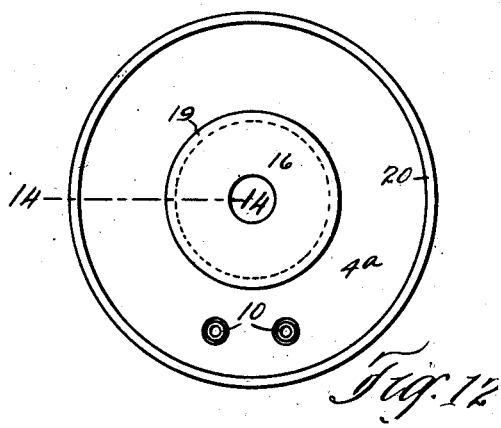
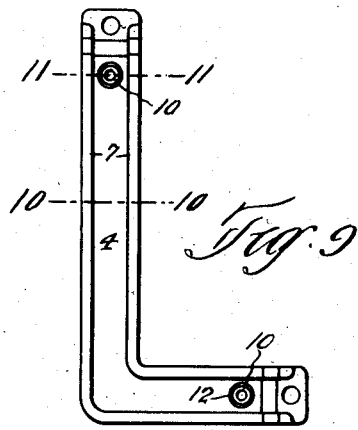
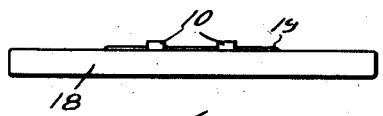
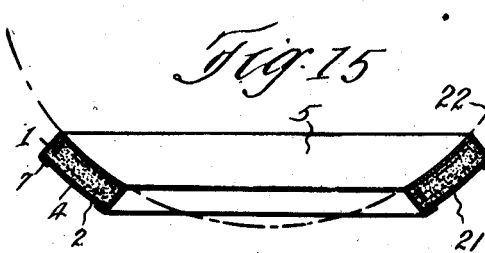
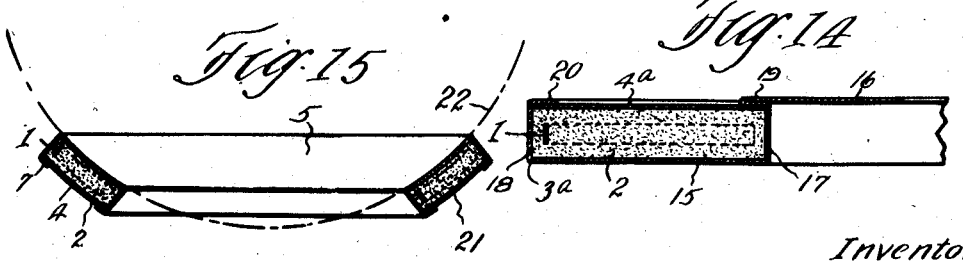

Patented Jan. 11, 1927.

1,614,331

UNITED STATES PATENT OFFICE.

EDWIN L. WIEGAND, OF DORMONT BOROUGH, PENNSYLVANIA.

ELECTRICAL HEATING ELEMENT.

Original application filed August 31, 1923, Serial No. 660,294. Divided and this application filed December 24, 1924. Serial No. 757,798.

My invention relates to improvements in electrical heating elements, and more particularly to a novel type of electrical heating element that is especially suitable for use in connection with various kinds of electrical appliances, the particular shape in which the element is made depending, in many instances, upon the form or character of the appliance wherewith it is to be used.

This application is a division of my application Serial No. 660,294, filed August 31, 1923, and, with respect to the generic invention disclosed in this and my former case, the general objects are to provide a durable, practically indestructible, simple and comparatively inexpensive yet highly efficient electrical heating element comprising a resistor enveloped in a mass of refractory electrical insulating heat conducting material that is highly compacted or compressed, as by suitable power means, about the resistor and within a sheet metal sheath or casing, the element being relatively thin and, due to the thinness of the sheet metal walls and a large ratio of surface area to mass, affording maximum heat emissivity.

As brought out in the original application, the heating element, by virtue of its construction and relatively thin walls and cross section, may be readily shaped to lie in intimate contact with the object to be heated, thereby to minimize resistance to the transfer of heat from the element to the object.

This case is restricted to a form of the invention wherein the element is in the nature of a strip that is oblong in cross section and is thin relatively to its width, the narrow edges of the element being other than straight in a linear direction. Therefore the element may assume, within the scope of this disclosure, any shape between a slight departure from a straight strip to a complete annulus, illustrative examples of the various shapes which the element may take being shown in the drawings accompanying and forming a part hereof and wherein Fig. 1 is a plan view of an annular heating element constructed in accordance with my invention; Fig. 2 is an edge view thereof; Fig. 3 is a plan view of an element of triangular shape; Fig. 4 is a similar view of an open ring type element; Fig. 5 is a plan view of a heating element having the shape of an inverted V; Fig. 6 shows, in plan, a heating element constructed in accordance with my invention and designed for use in a sad iron base; Figs. 7, 8 and 9 show modifications of the invention in the nature of strips that are other than straight in a linear direction; Figs. 10 and 11 are transverse sections on the respective lines 10—10 and 11—11 of the foregoing views; Fig. 12 is a further modification of the invention, the element being of annular form and having a web that extends across its central opening; Fig. 13 is an edge view of the element shown in Fig. 12; Fig. 14 is an enlarged sectional detail on the line 14—14 of Fig. 12; and Fig. 15 shows the form of the invention illustrated in Fig. 1 dished for application to the curved bottom of a vessel that is indicated in dot-and-dash line.

In all forms of the invention, a sinuous resistor 1 is enveloped within a mass 2 of suitable electrical insulating heat conducting material. The resistor preferably consists of a flat ribbon wire of suitable metal shown as bent back and forth across the element in comparatively close convolutions with its edges presented to the broad faces of the element; and while I do not limit myself to any particular kind of refractory insulating material, one class found especially suitable for the purpose is composed of magnesium or aluminum oxide, or zirconium silicate, either individually where possible or a compound of them, together, when desirable, with a binding material such as clay to give the necessary plasticity during fabrication and to effect homogeneity in the final product.

The mass 2 of refractory material is highly compacted, as by a suitable power press, within a sheet metal sheath or casing and about the resistor so that the resistor is thoroughly surrounded and enveloped by the material. In the forms of the invention illustrated in Figs. 1 to 9, the sheath or casing is comprised of members 3 and 4 (see particularly Figs. 10 and 11), the former being in the nature of a shallow sheet metal casing having a relatively wide wall 5 from the opposite sides of which extend at substantially right angles narrow marginal walls 6 which have their edges flanged inwardly at 7 over the lateral edges or marginal portion of the member 4 which constitutes a cover. While the foregoing describes my present preferred form of sheath or casing, I do not limit myself to the exact structural details set forth.

The ends of the resistor 1 are connected to terminals 10 which have their enlarged inner ends or bases to which the resistor is attached embedded within the mass 2 of refractory material. The terminals extend outwardly through holes 12 of the cover 4, the holes being enough larger than the terminals to insure proper spacing and consequential insulation from the casing and, as illustrated, the hole is closed by a washer 13 of mica or other suitable insulating material that fits over the terminal and is engaged against the inner side of the cover 4.

In the form of the invention illustrated in Figs. 12 to 14, the sheath or casing is comprised of the members 3ª and 4ª which are substantially identical with the respective members 3 and 4 of the previously described casing and enclose the resistor 1 with the mass 2 of refractory material wherein the resistor is embedded. The casing member 3ª, in the present instance, is formed from the edge portion of a sheet metal blank, the part constituting the bottom wall 15 of the casing member 3ª being offset from the plane of the central portion or web 16 and connected thereto by a wall 17 which, in the present form of the element, is cylindrical. A peripheral wall 18 rises from the outer edge of the wall 15. Where the wall 17 joins the web 16, the material is crimped upon itself to form a flange 19 that overlies the adjacent edge or marginal portion of the cover 4ª the same as the free edge of the wall 18 is flanged inwardly at 20 over the outer edge or marginal portion of the cover.

From the foregoing it will be seen that the form of the invention illustrated in Figs. 12 to 14 differs from that illustrated in Figs. 1 and 2 practically only by the inclusion of the web 16, and the center of this web is shown as having an aperture 21 through which a support for the element may be extended. This construction is especially suited to certain installations, the web providing a very convenient means of attaching the element to an appliance and serving also to close the space defined by the element where such is desired. Aside from the supporting function of the web 16, it is particularly desirable in some classes of cooking appliances where it is preferred to close the central opening of the element to prevent food overflow or other substances from passing through the opening to a substructure.

As previously stated herein, and as brought out in my original application above identified, the element may be formed to correspond to the contour of a vessel or other object to which the element is to be applied so that it will lie in intimate contact with the object to be heated. In Fig. 15, an element designated 21, which may be in the nature of that shown in Fig. 1 for example, is shown as dished to fit the curved bottom of a vessel that is indicated at 22 by dot-and-dash lines.

Having thus described my invention, what I claim is:—

1. As a new article of manufacture, an electrical heating element comprising a resistor, a sheet metal sheath enveloping said resistor and spaced therefrom, and a mass of granular refractory electrical insulating material filling the space between the resistor and the sheath, the element being oblong in cross section and thin relatively to its width, the narrow edges of the element being other than straight in a linear direction.

2. As a new article of manufacture, an electrical heating element comprising a resistor, a sheet metal sheath enveloping said resistor and spaced therefrom, and a mass of granular refractory electrical insulating material filling the space between the resistor and the sheath, the element being in the nature of a strip having edges that are spaced apart a substantially like distance throughout the length of the element and having an oblong cross section and being thin relatively to its width, the narrow edges of the element being other than straight in a linear direction.

3. As a new article of manufacture, an electrical heating element comprising a sinuous ribbon resistor, a sheet metal sheath enveloping said resistor and spaced therefrom, and a mass of granular refractory electrical insulating material filling the space between the resistor and the sheath, the element being in the nature of a strip having edges that are spaced a substantially like distance apart throughout the length of the element and having an oblong cross section and being thin relatively to its width, the edges of the sinuous ribbon resistor being presented toward the wider faces of the element, the narrow edges of the element being other than straight in a linear direction.

4. As a new article of manufacture, an electrical heating element comprising a resistor, a sheet metal sheath enveloping said resistor and spaced therefrom, and a mass of granular refractory electrical insulating material filling the space between the resistor and the sheath, the element being oblong in cross section and thin relatively to its width and having the form of an annulus.

5. As a new article of manufacture, an electrical heating element comprising a resistor, a sheet metal sheath enveloping said resistor and spaced therefrom, and a mass of granular refractory electrical insulating material filling the space between the resistor and the sheath, the element being in the nature of an endless strip that is thin relatively to its width, the inner narrow edge of the element defining a relatively large opening.

6. As a new article of manufacture, an electrical heating element comprising a resistor, a sheet metal sheath enveloping said resistor and spaced therefrom, and a mass of granular refractory electrical insulating material filling the space between the resistor and the sheath, the element being oblong in cross section and thin relatively to its width, the narrow edges of the element being other than straight in a linear direction, the said sheath being constructed of two main sections having their margins disposed adjacent the narrow edges of the mass of insulating material and connected together.

7. As a new article of manufacture, an electrical heating element comprising a resistor, a sheet metal sheath enveloping said resistor and spaced therefrom, and a mass of granular refractory electrical insulating material filling the space between the resistor and the sheath, the element being oblong in cross section and thin relatively to its width, the narrow edges of the element being other than straight in a linear direction, the said sheath being constructed of two sections, one having marginal flanges which extend over the narrow edges of the mass of insulating material and are connected to the margin of the other section.

8. As a new article of manufacture, an electrical heating element comprising a resistor, a sheet metal sheath enveloping said resistor and spaced therefrom, and a mass of granular refractory electrical insulating material filling the space between the resistor and the sheath, the element being oblong in cross section and thin relatively to its width, the narrow edges of the element being other than straight in a linear direction, the said sheath being constructed of two sections, one having marginal flanges which extend over the narrow edges of the mass of insulating material and are turned over the marginal portions of the other section.

9. An electric resistance heating element comprising an annular hollow sheet metal body having a flat working face, a sinuous resistor element of flat ribbon wire located inside said body extending generally circumferentially thereof but sinuously back and forth within said body and spaced therefrom, the edge of the wire being presented toward said working face, and a mass of granular refractory electrical insulating material filling the space between the resistor and the body.

10. An electrical heating element comprising a sheet metal member having its edge portion offset from the plane of its central portion by a relatively narrow wall, the member having a peripheral wall opposed to said narrow wall thereby to form a shallow channel shaped casing, a mass of granular refractory electrical insulating material filling said channel, a resistor embedded within said mass of insulating material and about which the material is compacted, and a cover closing the open side of the casing, the edges of said cover and the aforesaid narrow walls being connected together.

11. An electrical heating element comprising a circular sheet metal member having its edge portion offset from the plane of its central portion by a relatively narrow substantially cylindrical wall, the member having a peripheral wall concentric with said narrow wall thereby to form an annular shallow channel shaped casing, a mass of granular refractory electrical insulating material filling said casing, a resistor embedded within said mass of insulating material and about which said material is compacted, and an annular cover closing the open side of the casing, the edges of the aforesaid walls being turned over the edges of the cover.

In testimony whereof, I hereunto affix my signature.

EDWIN L. WIEGAND.